(No Model.) 2 Sheets—Sheet 1.
E. GAGER.
MACHINE FOR MAKING DOWEL PINS.
No. 253,997. Patented Feb. 21, 1882.
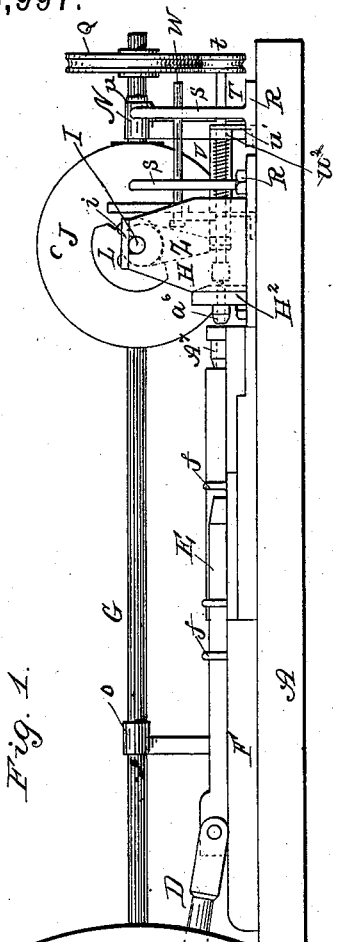
Fig. 1.
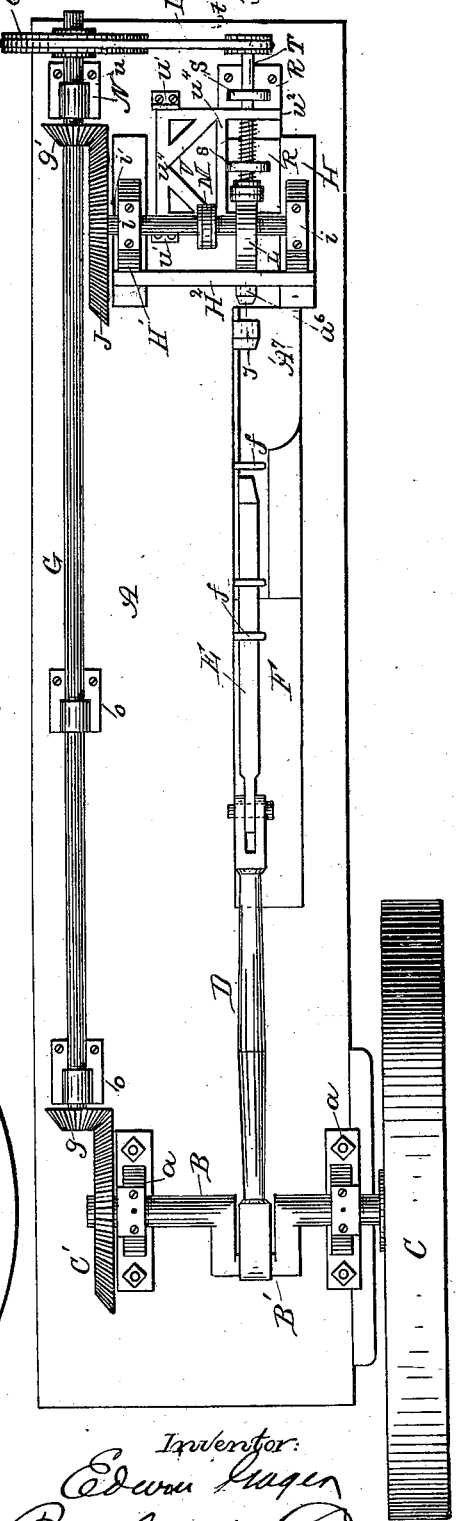
Fig. 2.
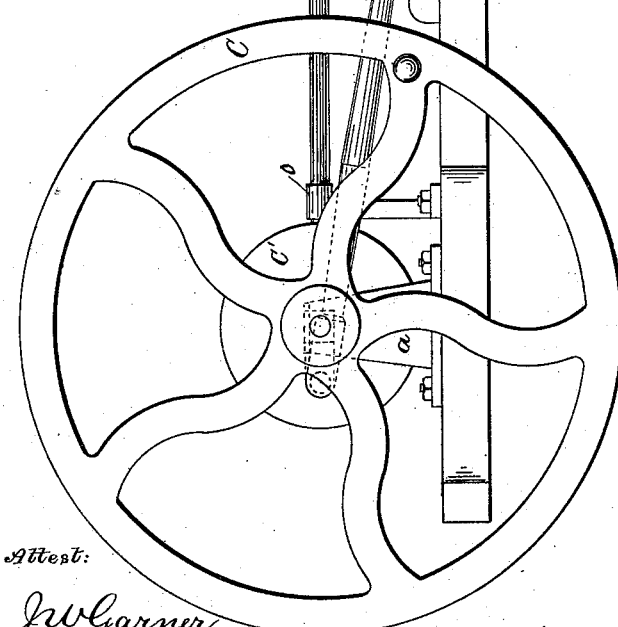
Attest:
J. W. Garner
W. S. D. Haines
Inventor:
Edwin Gager
By Soulé & Co.
Attorneys (No Model.)  2 Sheets—Sheet 2.

E. GAGER.
MACHINE FOR MAKING DOWEL PINS.

No. 253,997. Patented Feb. 21, 1882.

Attest:
J. W. Garner
W. S. D. Haines

Inventor:
Edwin Gager
By Soule & Co.
Attorneys

UNITED STATES PATENT OFFICE.

EDWIN GAGER, OF NORWALK, OHIO.

MACHINE FOR MAKING DOWEL-PINS.

SPECIFICATION forming part of Letters Patent No. 253,997, dated February 21, 1882.

Application filed December 10, 1881. (No model.)

*To all whom it may concern:*

Be it known that I, EDWIN GAGER, a citizen of Norwalk, residing at Norwalk, in the county of Huron and State of Ohio, have invented certain new and useful Improvements in Making Dowel-Pins; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to machines for rounding and pointing dowel-pins, the object being to provide a machine of simple and economical construction by means of which dowel-pins may be rapidly rounded and pointed.

The invention consists in the combinations of parts hereinafter described, and pointed out in the claims.

Figure 3:
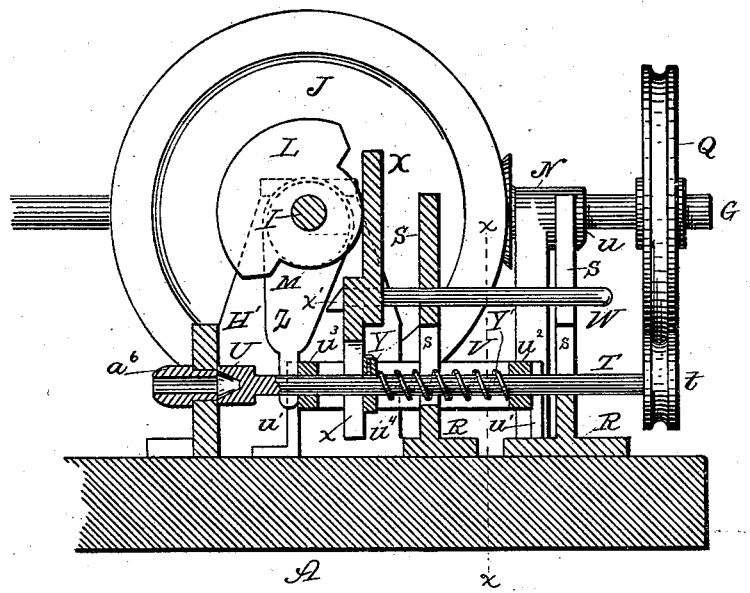
Figure 4:
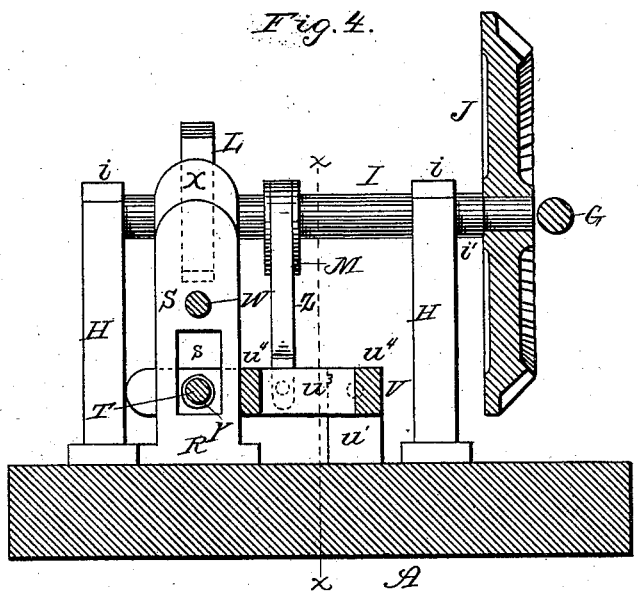

In the drawings, Figure 1 is a side elevation of a machine constructed in accordance with my invention. Fig. 2 is a plan view of the same. Fig. 3 is a section on the line $y\ y$, Fig. 2. Fig. 4 is a transverse section on the line $x\ x$, Fig. 3.

A represents the base of the machine, provided at one end with brackets $a$, which support a crank-shaft, B. To one end of the latter is secured a fly-wheel, C, while upon its opposite end is journaled a bevel-gear wheel, C'.

To the crank B' of the shaft B is secured a pitman, D, extending forward upon the base A and provided at its forward end with a plunger, E, the latter traveling upon a guide-block, F, which is provided with one or more guide-pins, $f$. At the opposite side of the base A is supported in bracket-bearings $o$ a revolving connecting-rod, G, whose function will be hereinafter explained.

Near the forward end of the base A are secured standards H H', to the lower ends of which is secured a transverse bar, H², which rests upon the base A, and is perforated near one of its ends to receive a hollow cylindrical die, $a^6$, the rear end of which is arranged adjacent to a square die or stationary cutter, A⁷, secured to the forward end of the block F.

I represents a shaft journaled in bearings $i$ in the standards H H' and projecting slightly beyond the standard H'. Upon the projection $i'$ of the shaft is mounted a gear-wheel, J. The shaft I also carries a cam, L, and an eccentric, M.

Adjacent to the gear-wheel J the base A is provided with another standard, N, arranged at a right angle to the standards H and H' and provided with a bearing, $u$, to receive the end of the rod G, the latter carrying a gear-pinion, $g'$, adapted to mesh with the wheel J and a band-wheel, Q.

R R represent two parallel cleats rigidly secured to the base A and arranged at about the same horizontal plane as the block F. Secured to these cleats, or formed integral with them, are upright guides S S. The latter each have a vertical slot, $s$, through which passes a horizontal rod or shaft, T, carrying at its outer end a band-wheel, $t$, while to its inner end is secured the revolving hollow cutter U.

V represents a vibrating frame journaled in brackets $u'$, secured upon the bed A. This frame consists of two bars, $u^2\ u^3$, the former extending between the guides S S and perforated to allow the passage through it of the shaft T, while the latter also projects horizontally the same distance, and is similarly perforated to receive the inner end of the shaft T. The cross-bars $u^4$ connect the bars $u^2\ u^3$ and complete the frame V.

A horizontal bar, W, passes through the guides S S, at about the center of the latter, and is secured at its inner end to an upright guide-plate, X, against which the cam L bears, and which has a vertical slot, $x$, at its lower end, within which the shaft T extends. The plate X is provided with an inclined projection, $x'$, to engage the cam L. The shaft T is provided with an adjustable collar or stop, Y, adapted to bear against the guide X, and a spiral spring, Y', surrounding the shaft, and having one end bearing against the collar Y, while the opposite end bears against the bar $u^2$ of the frame V. The latter is vibrated by means of a link, Z, secured at its lower end to the bar $u^3$, its upper end being constructed to fit over and be operated by the eccentric M on the shaft I. The rod G carries at its rear end a pinion, $g$, which meshes with the gear-wheel C' on the driving-shaft, and a band, L⁴, connects the band-wheels Q and $t$.

Having thus described the construction of my machine, I will now describe its operation.

Motion being imparted to the crank-shaft B from any suitable motor, the rod G will be revolved, with its pinion $g'$, which meshes with the wheel J, thus revolving the gear-wheel J and shaft I, the latter carrying the cam L and eccentric M. The shaft G will also revolve the band-wheel Q, from which motion will be imparted to the wheel $t$ by the band-wheel Q. Thus the shaft T, carrying the pointing-knife, is rapidly revolved, and the frame V, being connected to the eccentric M, is vibrated, thus raising and lowering the shaft carrying the cutting-knife, and the latter is horizontally reciprocated or retracted by means of the cam L abutting against the guide-plate X and its projection $x'$. The pitman D is operated from the crank B' and reciprocates the plunger E. A pin-blank is fed upon the block F, and is forced by the plunger through the squaring knife or die $A^7$. Another blank is then fed to the machine in the same manner, and the action of the plunger on it will drive it in contact with the first blank and force the latter through the rounding-die and in contact with the rapidly-revolving hollow cutter U, which points the rounded pin. The shaft T is then retracted by the cam and spiral spring and raised by the frame V, connected to the eccentric, and the completed pin is dropped onto the base of the machine and into a suitable receptacle provided for it below the base.

It will be seen that by the above-described construction dowel-pins may be rapidly made and pointed.

It is evident that many changes in construction may be resorted to without departing from my invention, and I do not limit myself to the particular construction shown, but reserve to myself the right to make any modifications and changes which may fairly come within the scope of my invention.

I claim—

1. In a machine for making wooden pins, the combination, with the driving crank-shaft, of a pitman and a plunger adapted to drive the pin-blanks, a block upon which said plunger is guided, suitable stationary shaping-dies, and a revolving hollow cutter, substantially as described.

2. In a machine for making dowel-pins, the combination, with devices for squaring and rounding the pin-blank, of a revolving shaft carrying a hollow cutter, and means, substantially as described, for automatically retracting, raising, and lowering said shaft, as set forth.

3. The combination, with the standards and the revolving shaft and pointing-cutter, of the vibrating frame and the eccentric and connecting-link, substantially as described.

4. In a machine for making dowel-pins, the combination, with the base A, the standards H H', and the shaft I, mounted in bearings of said standards, of the slotted guides S and guide-plate X, a cam, L, and eccentric M, mounted on the shaft I, a vibrating frame, V, a link, Z, connecting said frame to the shaft I, a shaft, T, carrying a hollow cutter, U, and means for rotating the latter, substantially as set forth.

5. In a machine for making dowel-pins, the combination, with the blank feeding and shaping devices, of the slotted guides S, the frame V, the guide-plate X, the revolving shaft T, the collar Y, and spiral spring Y', arranged as described, and adapted to retract the shaft T, substantially as set forth.

6. The combination, with the standards H and H' and the gearing, of the vibrating frame V, the revolving shaft T and hollow cutter U, the rod Y, having the projection $x'$, and the spring Y', encircling the shaft T, substantially as set forth.

In testimony whereof I affix my signature in presence of two witnesses.

EDWIN GAGER.

Witnesses:
C. B. STICKNEY,
W. O. MONNETT.